United States Patent
Pajukoski et al.

(10) Patent No.: US 11,064,448 B2
(45) Date of Patent: Jul. 13, 2021

(54) POWER AND ENERGY EFFICIENT WAVEFORM FOR FREQUENCY RANGE FR2 AND FR3

(71) Applicant: NOKIA TECHNOLOGIES OY, Espoo (FI)

(72) Inventors: Kari Pajukoski, Oulu (FI); Frederick Vook, Schaumburg, IL (US); Rapeepat Ratasuk, Hoffman Estates, IL (US)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 16/157,372

(22) Filed: Oct. 11, 2018

(65) Prior Publication Data

US 2020/0120623 A1    Apr. 16, 2020

(51) Int. Cl.
*H04L 27/26*    (2006.01)
*H04W 56/00*    (2009.01)
*H04W 72/04*    (2009.01)

(52) U.S. Cl.
CPC ....... *H04W 56/001* (2013.01); *H04L 27/2602* (2013.01); *H04L 27/2614* (2013.01); *H04W 72/042* (2013.01)

(58) Field of Classification Search
CPC . H04L 5/0005; H04L 5/0092; H04L 27/2602; H04L 27/2614; H04W 56/001; H04W 72/042
See application file for complete search history.

(56) References Cited

U.S. PATENT DOCUMENTS

| | | | | |
|---|---|---|---|---|
| 8,149,969 B2* | 4/2012 | Khan | ................ | H04L 25/03828 375/347 |
| 8,379,752 B2* | 2/2013 | Kleider | ............... | H04L 27/2626 375/267 |
| 2012/0294616 A1* | 11/2012 | Sasaki | ................. | H04J 14/0298 398/79 |
| 2018/0184390 A1* | 6/2018 | Wu | ................... | H04W 56/0005 |

(Continued)

OTHER PUBLICATIONS

Qualcomm, "New SID on NR waveform beyong 52.6GHz", 3GPP TSG RAN Meeting #79, Chennai, India, Mar. 19-22, 2019, RP-180453, 4 pages.

(Continued)

*Primary Examiner* — Alpus Hsu
(74) *Attorney, Agent, or Firm* — Squire Patton Boggs (US) LLP (57) ABSTRACT

Various communication systems may benefit from improved single carrier-based waveform techniques. An apparatus may comprise at least one memory comprising computer program code and at least one processor. The at least one memory and the computer program code are configured, with the at least one processor, to cause the apparatus at least to transmit at least one indication of synchronization signal block (SSB) to a network entity. The apparatus further receives at least one bandwidth part comprising at least one SSB associated with CP-OFDM waveform and/or at least one SSB below at least one threshold peak to average ratio. The apparatus further configures at least one waveform based upon the received at least one SSB. The at least one SSB below at least one threshold PAR comprise at least one indication of PDCCH.

7 Claims, 4 Drawing Sheets

(56) References Cited

U.S. PATENT DOCUMENTS

2019/0342045 A1* 11/2019 Radulescu .............. H04L 5/001
2020/0037260 A1* 1/2020 Fu ....................... H04W 52/325

OTHER PUBLICATIONS

Intel Coroporation, "New SID: Study on NR design above 52.6GHz", 3GPP TSG RAN Meeting #79, Chennai, India, Mar. 19-22, 2018, RP-180320, 4 pages.
Kulkarni et al., "Coverage and Rate Trends in Moderate and High Bandwidth 5G Networks", in Proc. IEEE Globecom 2014, Dec. 2014, pp. 422-426.
Nokia, Alcatel-Lucent Shanghai Bell, "Potential for system level gains with low PAPR waveforms", 3GPP TSG-RAN WG1 #86, Gothenburg, Sweden, Aug. 22-26, 2016, R1-167795, 5 pages.
Okia, Alcatel-Lucent Shanghai Bell, "Waveform proposal for carrier frequencies beyong 40 GHz", 3GPP TSG-RAN WG1 #86, Gothenburg, Sweden, Aug. 22-26, 2016, R1-167794, 7 pages.

* cited by examiner

POWER AND ENERGY EFFICIENT WAVEFORM FOR FREQUENCY RANGE FR2 AND FR3

BACKGROUND

Field

Various communication systems may benefit from improved single carrier-based waveform techniques. For example, certain communication systems may benefit from waveform techniques which support legacy orthogonal frequency division multiplexing while also providing power-efficient single carrier properties.

Description of the Related Art

New Radio Release-15 relates to wireless operations for frequencies up to 52.6 GHz. The downlink waveform is Cyclic Prefix Orthogonal Frequency Division Multiplexing (CP-OFDM). Next Generation (NG) systems above 52.6 GHz will need to accommodate increased path loss, larger arrays, and less efficient RF components such as power amplifiers (PAs). Single-carrier (SC) waveforms are preferred over OFDM because of their low peak-to-average power ratio (PAPR) properties. The low PAPR waveform enables PAs to run at a higher power to maintain coverage. CP-OFDM modulation would be beneficial for non-power limited UEs utilizing MIMO or higher order modulation. Hence, systems above 52.6 GHz need to support both SC and CP-OFDM waveforms.

SUMMARY

In accordance with certain embodiments, a method may include transmitting, by a user equipment, at least one indication of synchronization signal block (SSB) capability to a network entity. The method may further include receiving, by the user equipment, at least one bandwidth part comprising at least one SSB associated with legacy waveform and/or at least one SSB below at least one threshold peak to average ratio from the network entity. The method may further include configuring, by the user equipment, at least one waveform. The at least one SSB below at least one threshold PAR comprise at least one indication of PDCCH.

In accordance with certain embodiments, an apparatus may include at least one processor and at least one memory including computer program code. The at least one memory and the computer program code can be configured to, with the at least one processor, cause the apparatus to at least transmit at least one indication of synchronization signal block (SSB) capability to a network entity. The at least one memory and the computer program code can be configured to, with the at least one processor, further cause the apparatus to at least receive at least one bandwidth part comprising at least one SSB associated with legacy waveform and/or at least one SSB below at least one threshold peak to average ratio from the network entity. The at least one memory and the computer program code can be configured to, with the at least one processor, further cause the apparatus to at least configure at least one waveform. The at least one SSB below at least one threshold PAR comprise at least one indication of PDCCH.

In accordance with certain embodiments, an apparatus may include means for transmitting at least one indication of synchronization signal block (SSB) capability to a network entity. The apparatus may further include means for receiving at least one bandwidth part comprising at least one SSB associated with legacy waveform and/or at least one SSB below at least one threshold peak to average ratio from the network entity. The apparatus may further include means for configuring at least one waveform. The at least one SSB below at least one threshold PAR comprise at least one indication of PDCCH.

In accordance with certain embodiments, a non-transitory computer readable medium can, in certain embodiments, be encoded with instructions that may, when executed in hardware, perform a process. The process may include a method that may transmit at least one indication of synchronization signal block (SS) capability to a network entity. The method may further receive at least one bandwidth part comprising at least one SSB associated with legacy waveform and/or at least one SSB below at least one threshold peak to average ratio from the network entity. The method may further configure at least one waveform. The at least one SSB below at least one threshold PAR comprise at least one indication of PDCCH.

In accordance with certain embodiments, a computer program product may have instructions encoded for performing a process. The process may include a method that may transmit at least one indication of synchronization signal block (SSB) capability to a network entity. The method may further receive at least one bandwidth part comprising at least one SSB associated with legacy waveform and/or at least one SSB below at least one threshold peak to average ratio from the network entity. The method may further configure at least one waveform. The at least one SSB below at least one threshold PAR comprise at least one indication of PDCCH.

In accordance with certain embodiments, an apparatus may include circuitry configured to transmit at least one indication of synchronization signal block (SSB) capability to a network entity. The apparatus may further include circuitry configured to receive at least one bandwidth part comprising at least one SSB associated with legacy waveform and/or at least one SSB below at least one threshold peak to average ratio from the network entity. The apparatus may further include circuitry configured to configure at least one waveform. The at least one SSB below at least one threshold PAR comprise at least one indication of PDCCH.

In accordance with certain embodiments, a method may include receiving, by a network entity, at least one indication of synchronization signal block (SSB) capability from a user equipment. The method may further include transmitting, by the network entity, at least one bandwidth part comprising at least one SSB associated with legacy waveform and/or at least one SSB below at least one threshold peak to average ratio to the user equipment.

In accordance with certain embodiments, an apparatus may include at least one processor and at least one memory including computer program code. The at least one memory and the computer program code can be configured to, with the at least one processor, cause the apparatus to at least receive at least one indication of synchronization signal block (SSB) capability from a user equipment. The at least one memory and the computer program code can be configured to, with the at least one processor, further cause the apparatus to at least transmit at least one bandwidth part comprising at least one SSB associated with legacy waveform and/or at least one SSB below at least one threshold peak to average ratio to the user equipment.

In accordance with certain embodiments, an apparatus may include means for receiving at least one indication of synchronization signal block (SSB) capability from a user equipment. The apparatus may further include means for transmit at least one bandwidth part comprising at least one SSB associated with legacy waveform and/or at least one SSB below at least one threshold peak to average ratio to the user equipment.

In accordance with certain embodiments, a non-transitory computer readable medium can, in certain embodiments, be encoded with instructions that may, when executed in hardware, perform a process. The process may include a method that may receive at least one indication of synchronization signal block (SSB) capability from a user equipment. The method may further transmit at least one bandwidth part comprising at least one SSB associated with legacy waveform and/or at least one SSB below at least one threshold peak to average ratio to the user equipment.

In accordance with certain embodiments, a computer program product may have instructions encoded for performing a process. The process may include a method that may receive at least one indication of synchronization signal block (SSB) capability from a user equipment. The method may further transmit at least one bandwidth part comprising at least one SSB associated with legacy waveform and/or at least one SSB below at least one threshold peak to average ratio to the user equipment.

In accordance with certain embodiments, an apparatus may include circuitry configured to receive at least one indication of synchronization signal block (SSB) capability from a user equipment. The apparatus may further include circuitry configured to transmit at least one bandwidth part comprising at least one SSB associated with legacy waveform and/or at least one SSB below at least one threshold peak to average ratio to the user equipment.

BRIEF DESCRIPTION OF THE DRAWINGS

For proper understanding of the invention, reference should be made to the accompanying drawings, wherein.

DETAILED DESCRIPTION

Certain embodiments discussed herein may provide a procedure for allowing power and cost efficient single carrier operation in downlink while also maintaining an option to use legacy OFDMA. Certain embodiments are, therefore, directed to improvements in computer-related technology, specifically, by conserving network resources and reducing power consumption of the UE and/or a network entity located within the network.

Figure 1:
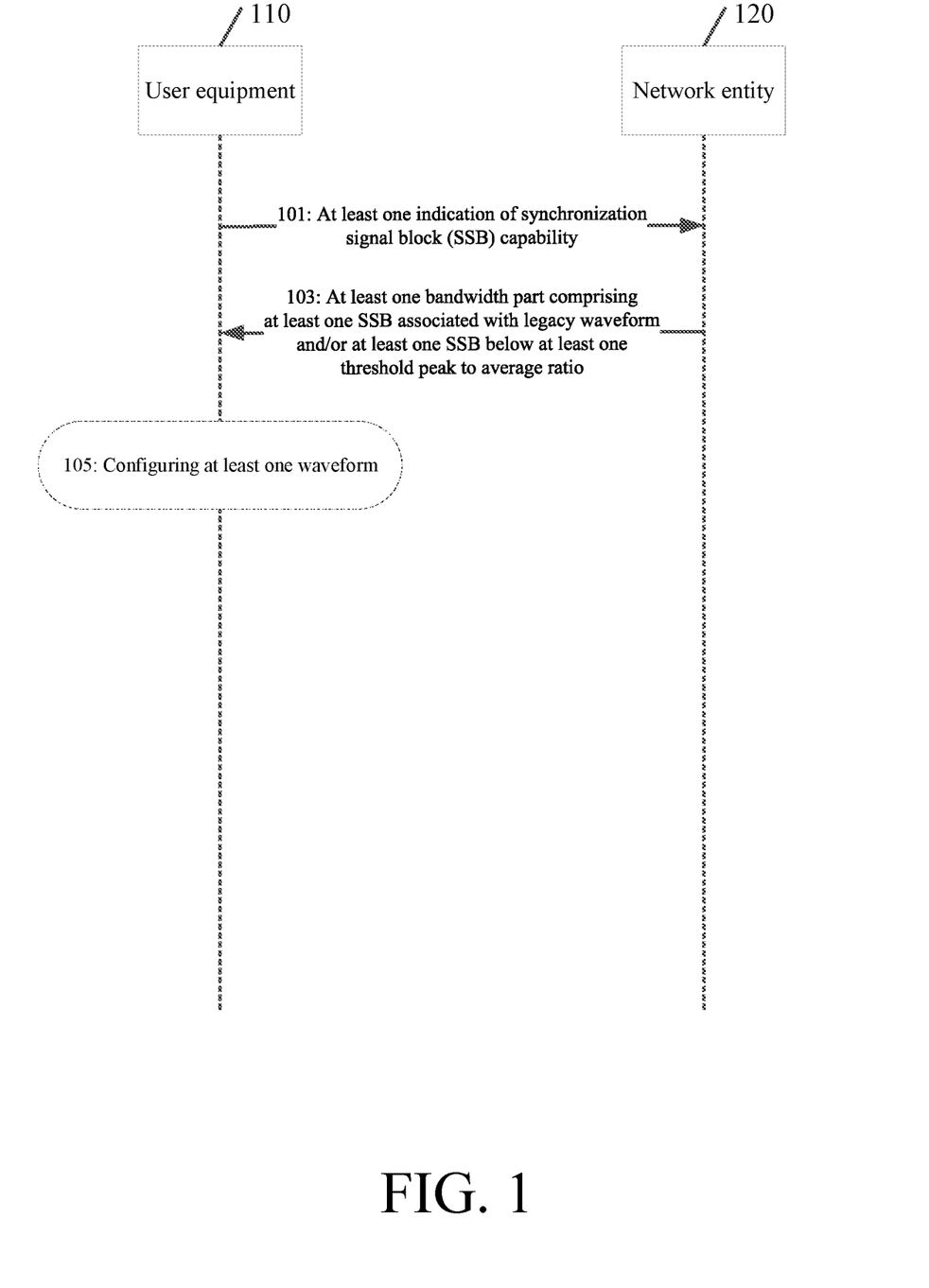
FIG. 1 illustrates an example of a signaling diagram according to certain embodiments.
Figure 4:
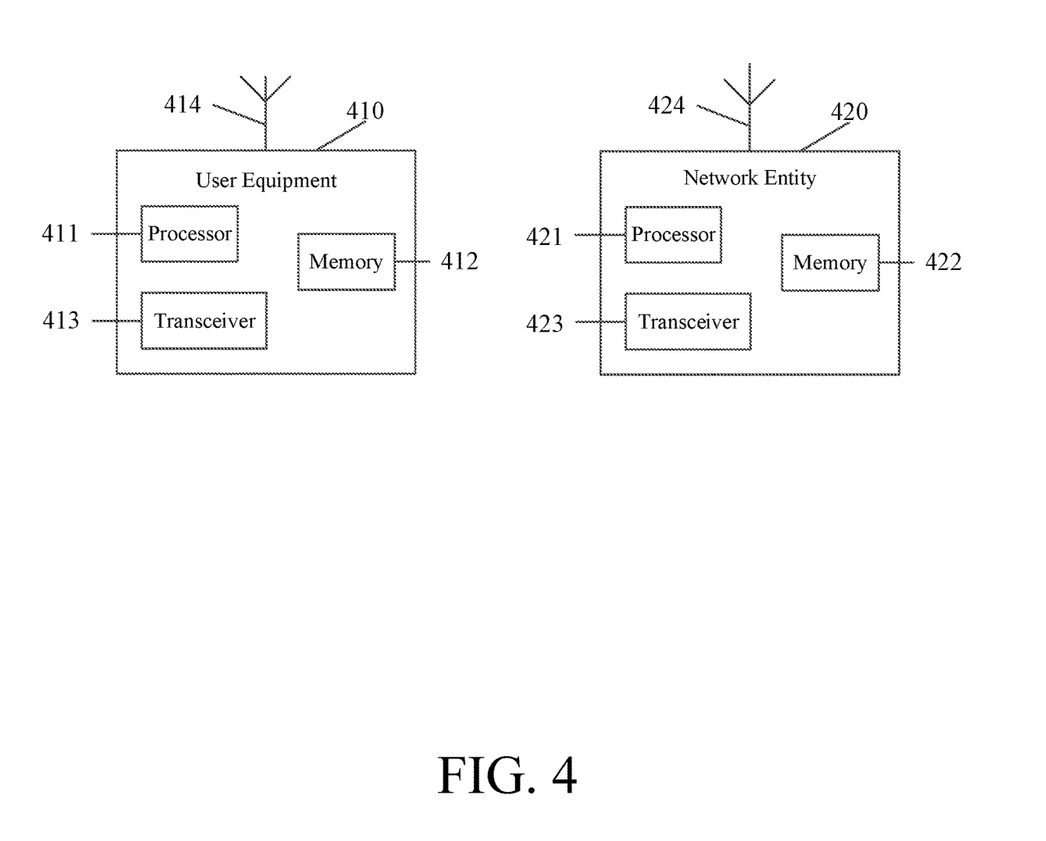
FIG. 4 illustrates a system according to certain embodiments.

FIG. 1 illustrates an example of a signal flow diagram of signaling between user equipment (UE) 110, such as user equipment 410, and network entity (NE) 120, such as network entity 420, both of which are illustrated in FIG. 4. Beginning at step 101, UE 110 may transmit at least one indication of synchronization signal block (SSB) capability and/or physical broadcast channel (PBCH) capability to NE 120.

In step 103, NE 120 may transmit at least one bandwidth part comprising at least one SSB associated with legacy waveform and/or at least one SSB below at least one threshold peak to average ratio to UE 110. The at least one SSB may be associated with at least one physical downlink control channel (PDCCH) comprising a peak to average ratio (PAR) below a threshold, and/or may be associated with at least one bandwidth part (BWP).

In some embodiments, at least one SSB may be associated with at least one type of SSB. For example, the at least one SSB may be a root index, a cyclic shift, and/or below a threshold sequence, while at least one type of SSB may be a SSB below a threshold PAR and/or a legacy SSB.

In some embodiments, a different SSB time placement, such as a primary synchronization signal (PSS) and/or secondary synchronization signal (SSS), may be associated with at least one type of SSB, for example, a SSB below a threshold PAR and/or a legacy SSB.

In some embodiments, the at least one PSS and/or SSB may be associated with a threshold level of PAR, for example, pi/2 rotated m-sequences, such as m-sequence in Release 15. Furthermore, at least one PBCH and/or PDCCH DMRS and their associated data may be time multiplexed.

In some embodiments, NE 120 may also transmit at least one radio resource control (RRC) signaling and/or at least one downlink control information (DCI) to UE 110. NE 120 may use the at least one RRC signaling and/or DCI to configure at least one single carrier BWP and/or at least one orthogonal frequency division multiplexing (OFDM) BWP with UE 110.

In some embodiments, at least one SSB different in time from other SSBs may indicate at least one BWP and/or at least one single carrier comprising a peak to average ratio (PAR) below a threshold. For example, at least one SSB time-domain pattern may be configured to be associated with a threshold PAR and/or legacy access.

In step 105, UE 110 may configure at least one waveform based upon the received at least one SSB. In some embodiments, UE 110 may configure the at least one waveform based upon at least one BWP associated with the received at least one SSB.

Figure 2:
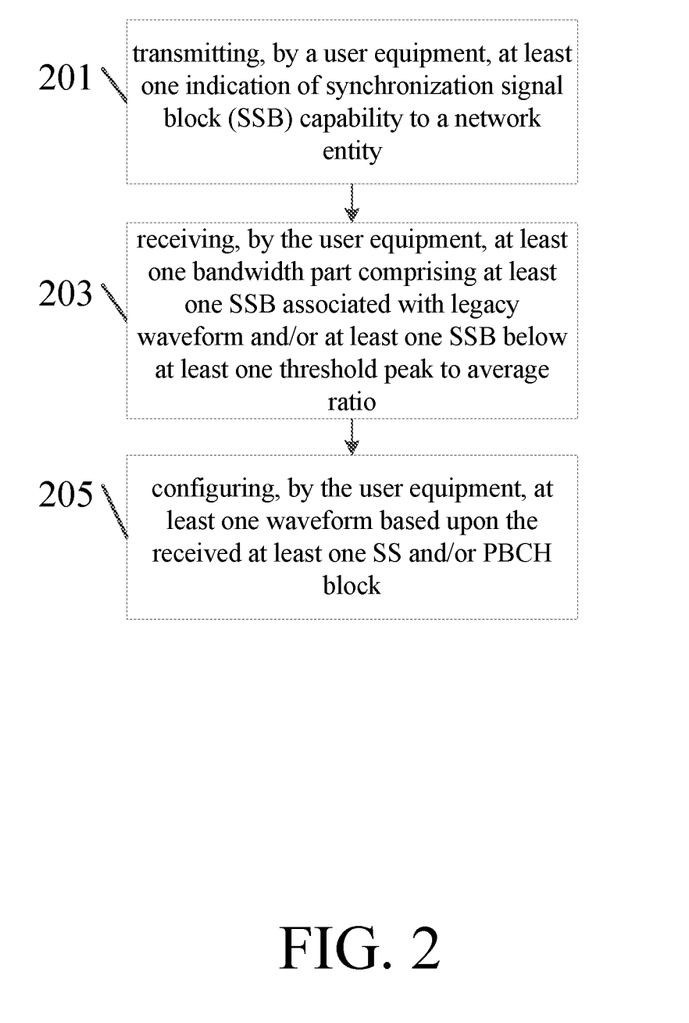
FIG. 2 illustrates an example of a method performed by a user equipment according to certain embodiments.

FIG. 2 illustrates an example of a method according to certain embodiments. In step 201, a user equipment, such as UE 410 illustrated in FIG. 4, may transmit at least one indication of synchronization signal block (SSB) capability to a network entity, such as NE 420 illustrated in FIG. 4.

In step 203, the user equipment may receive at least one bandwidth part comprising at least one SSB associated with legacy waveform and/or at least one SSB below at least one threshold peak to average ratio from the network entity. The at least one SSB may be associated with at least one physical downlink control channel (PDCCH) comprising a peak to average ratio (PAR) below a threshold, and/or may be associated with at least one bandwidth part (BWP).

In some embodiments, at least one SSB may be associated with at least one type of SSB. For example, the at least one SSB may be a root index, a cyclic shift, and/or below a threshold sequence, while at least one type of SSB may be a SSB below a threshold PAR and/or a legacy SSB.

In some embodiments, a different SSB time placement, such as a primary synchronization signal (PSS) and/or secondary synchronization signal (SSS), may be associated with at least one type of SSB, for example, a SSB below a threshold PAR and/or a legacy SSB.

In some embodiments, the at least one PSS and/or SSB may be associated with a threshold level of PAR, for example, pi/2 rotated m-sequences, such as m-sequence in Release 15. Furthermore, at least one PBCH and/or PDCCH DMRS and their associated data may be time multiplexed.

In some embodiments, the user equipment may also receive at least one radio resource control (RRC) signaling and/or at least one downlink control information (DCI) from the network entity. The user equipment may use the at least one RRC signaling and/or DCI to configure at least one single carrier BWP and/or at least one orthogonal frequency division multiplexing (OFDM) BWP.

In some embodiments, at least one SSB different in time from other SSBs may indicate at least one BWP and/or at least one single carrier comprising a peak to average ratio (PAR) below a threshold. For example, at least one SSB time-domain pattern may be configured to be associated with a threshold PAR and/or legacy access.

In step 205, the user equipment may configure at least one waveform based upon the received at least one SSB. In some embodiments, the user equipment may configure the at least one waveform based upon at least one BWP associated with the received at least one SSB.

Figure 3:
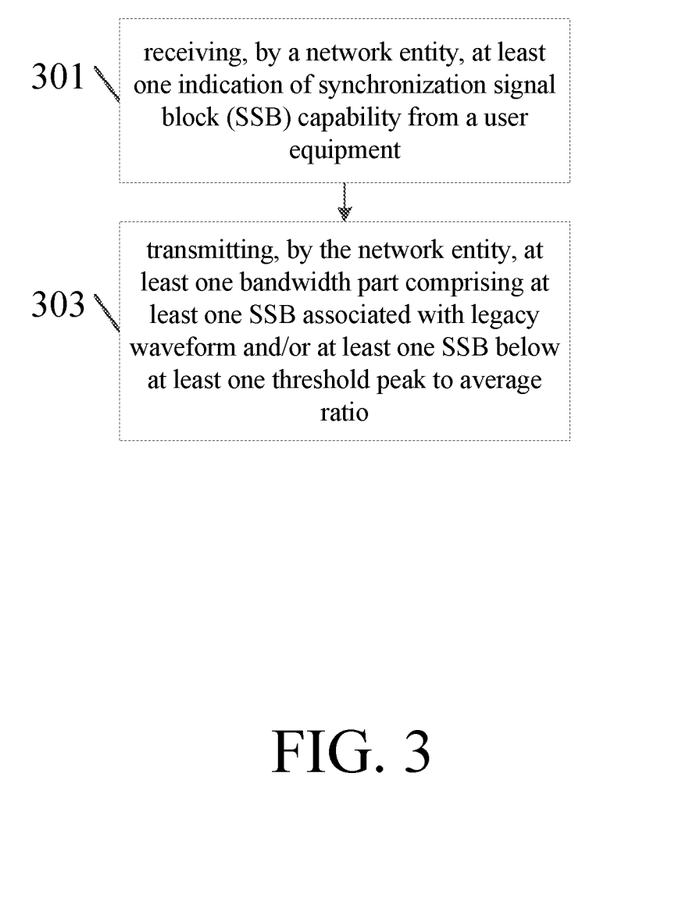
FIG. 3 illustrates an example of a method performed by a network entity according to certain embodiments.

FIG. 3 illustrates an example of a method performed by a network entity according to certain embodiments. In step 301, a network entity, such as NE 420 illustrated in FIG. 4, may receive at least one indication of synchronization signal block (SSB) capability from a user equipment, such as UE 410.

In step 303, the network entity may transmit at least one bandwidth part comprising at least one SSB associated with legacy waveform and/or at least one SSB below at least one threshold peak to average ratio to the user equipment. The at least one SSB may be associated with at least one physical downlink control channel (PDCCH) comprising a peak to average ratio (PAR) below a threshold, and/or may be associated with at least one bandwidth part (BWP).

In some embodiments, at least one SSB may be associated with at least one type of SSB. For example, the at least one SSB may be a root index, a cyclic shift, and/or below a threshold sequence, while at least one type of SSB may be a SSB below a threshold PAR and/or a legacy SSB.

In some embodiments, a different SSB time placement, such as a primary synchronization signal (PSS) and/or secondary synchronization signal (SSS), may be associated with at least one type of SSB, for example, a SSB below a threshold PAR and/or a legacy SSB.

In some embodiments, the at least one PSS and/or SSB may be associated with a threshold level of PAR, for example, pi/2 rotated m-sequences, such as m-sequence in Release 15. Furthermore, at least one PBCH and/or PDCCH DMRS and their associated data may be time multiplexed.

In some embodiments, the network entity may also transmit at least one radio resource control (RRC) signaling and/or at least one downlink control information (DCI) to the user equipment. The network entity may use the at least one RRC signaling and/or DCI to configure at least one single carrier BWP and/or at least one orthogonal frequency division multiplexing (OFDM) BWP with the user equipment.

In some embodiments, at least one SSB different in time from other SSBs may indicate at least one BWP and/or at least one single carrier comprising a peak to average ratio (PAR) below a threshold. For example, at least one SSB time-domain pattern may be configured to be associated with a threshold PAR and/or legacy access.

FIG. 4 illustrates a system according to certain embodiments. It should be understood that each signal or block in FIGS. 1-3 may be implemented by various means or their combinations, such as hardware, software, firmware, one or more processors and/or circuitry. In one embodiment, a system may include several devices, such as, for example, user equipment 410 and/or network entity 420. The system may include more than one user equipment 410 and more than one network entity 420.

User equipment 414 may be a mobile station (MS) such as a mobile phone or smart phone or multimedia device, an IoT cellular device, a computer, such as a tablet, provided with wireless communication capabilities, personal data or digital assistant (PDA) provided with wireless communication capabilities, portable media player, digital camera, pocket video camera, navigation unit provided with wireless communication capabilities or any combinations thereof.

Network entity 420 may be a citizens broadband radio service device (CBSD), a base station, an access point, an access node, an evolved node B (eNB), a 5G base station (gNB), a server, a host, a mobility management entity (MME), a serving gateway (S-GW), a packet data network gateway (P-GW), a policy and charging rules function (PCRF), a proxy-call session control function (P-CSCF), emergency—call session control function (E/CSCF), or any other network entity that may communicate with user equipment 410.

Each of these devices may include at least one processor or control unit or module, respectively indicated as 411 and 421. At least one memory may be provided in each device, and indicated as 412 and 422, respectively. The memory may include computer program instructions or computer code contained therein. One or more transceivers 413 and 423 may be provided, and each device may also include an antenna, respectively illustrated as 414 and 424. Although only one antenna each is shown, many antennas and multiple antenna elements may be provided to each of the devices. Other configurations of these devices, for example, may be provided. For example, user equipment 410 and/or network entity 420 may be additionally configured for wired communication, in addition to wireless communication, and in such a case, antennas 414 and 424 may illustrate any form of communication hardware, without being limited to merely an antenna.

Transceivers 413 and 423 may each, independently, be a transmitter, a receiver, or both a transmitter and a receiver, or a unit or device that may be configured both for transmission and reception. The transmitter and/or receiver (as far as radio parts are concerned) may also be implemented as a remote radio head which is not located in the device itself, but in a mast, for example. The operations and functionalities may be performed in different entities, such as nodes, hosts or servers, in a flexible manner. In other words, division of labor may vary case by case. One possible use is to make a network node deliver local content. One or more functionalities may also be implemented as virtual application(s) in software that can run on a server.

In some embodiments, an apparatus, such as a user equipment or a network node, may include means for carrying out embodiments described above in relation to FIGS. 1-3. In certain embodiments, at least one memory including computer program code can be configured to, with the at least one processor, cause the apparatus at least to perform any of the processes described herein.

Processors 411 and 421 may be embodied by any computational or data processing device, such as a central processing unit (CPU), digital signal processor (DSP), application specific integrated circuit (ASIC), programmable logic devices (PLDs), field programmable gate arrays (FPGAs), digitally enhanced circuits, or comparable device or a combination thereof. The processors may be implemented as a single controller, or a plurality of controllers or processors.

For firmware or software, the implementation may include modules or unit of at least one chip set (for example, procedures, functions, and so on). Memories 412 and 422 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate therefrom. Furthermore, the computer program instructions may be stored in the memory and which may be processed by the processors can be any suitable form of computer program code, for example, a compiled or interpreted computer program written in any suitable programming language. The memory or data storage entity is typically internal but may also be external or a combination thereof, such as in the case when additional memory capacity is obtained from a service provider. The memory may be fixed or removable.

The memory and the computer program instructions may be configured, with the processor for the particular device, to cause a hardware apparatus such as user equipment 410 and/or network entity 420, to perform any of the processes described above (see, for example, FIGS. 1-3). Therefore, in certain embodiments, a non-transitory computer-readable medium may be encoded with computer instructions or one or more computer program (such as added or updated software routine, applet or macro) that, when executed in hardware, may perform a process such as one of the processes described herein. Computer programs may be coded by a programming language, which may be a high-level programming language, such as objective-C, C, C++, C#, Java, etc., or a low-level programming language, such as a machine language, or assembler. Alternatively, certain embodiments may be performed entirely in hardware.

Furthermore, although FIG. 4 illustrates a system including a user equipment 410 and/or network entity 420, certain embodiments may be applicable to other configurations, and configurations involving additional elements, as illustrated and discussed herein. For example, multiple user equipment devices and multiple base stations may be present, or other nodes providing similar functionality, such as nodes that combine the functionality of a user equipment and a base station, such as a relay node. User equipment 410 may likewise be provided with a variety of configurations for communication other than communicating with network entity 420. For example, user equipment 410 may be configured for device-to-device, machine-to-machine, or vehicle-to-vehicle communication.

As shown in FIG. 4, transceivers 413 and 423 may be provided, and one or more devices may also include at least one antenna, respectively illustrated as 414 and 424. The device may have many antennas, such as an array of antennas configured for multiple input multiple output (MIMO) communications, or multiple antennas for multiple radio access technologies. Other configurations of these devices, for example, may be provided.

Transceivers 413 and 423 may be a transmitter, a receiver, or both a transmitter and a receiver, or a unit or device that may be configured both for transmission and reception.

Processors 411 and 421 may be embodied by any computational or data processing device, such as a central processing unit (CPU), application specific integrated circuit (ASIC), or comparable device. The processors may be implemented as a single controller, or a plurality of controllers or processors.

Memories 412 and 422 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate from the one or more processors. Furthermore, the computer program instructions stored in the memory and which may be processed by the processors may be any suitable form of computer program code, for example, a compiled or interpreted computer program written in any suitable programming language. Memory may be removable or non-removable.

The memory and the computer program instructions may be configured, with the processor for the particular device, to cause a hardware apparatus such as user equipment to perform any of the processes described below (see, for example, FIGS. 1-3). Therefore, in certain embodiments, a non-transitory computer-readable medium may be encoded with computer instructions that, when executed in hardware, perform a process such as one of the processes described herein. Alternatively, certain embodiments may be performed entirely in hardware.

In certain embodiments, an apparatus may include circuitry configured to perform any of the processes or functions illustrated in FIGS. 1-3. For example, circuitry may be hardware-only circuit implementations, such as analog and/or digital circuitry. In another example, circuitry may be a combination of hardware circuits and software, such as a combination of analog and/or digital hardware circuit(s) with software or firmware, and/or any portions of hardware processor(s) with software (including digital signal processor(s)), software, and at least one memory that work together to cause an apparatus to perform various processes or functions. In yet another example, circuitry may be hardware circuit(s) and or processor(s), such as a microprocessor(s) or a portion of a microprocessor(s), that include software, such as firmware for operation. Software in circuitry may not be present when it is not needed for the operation of the hardware.

The features, structures, or characteristics of certain embodiments described throughout this specification may be combined in any suitable manner in one or more embodiments. For example, the usage of the phrases "certain embodiments," "some embodiments," "other embodiments," or other similar language, throughout this specification refers to the fact that a particular feature, structure, or characteristic described in connection with the embodiment may be included in at least one embodiment of the present invention. Thus, appearance of the phrases "in certain embodiments," "in some embodiments," "in other embodiments," or other similar language, throughout this specification does not necessarily refer to the same group of embodiments, and the described features, structures, or characteristics may be combined in any suitable manner in one or more embodiments.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. The above embodiments may be applied to any communication network or wireless system. While many of the above embodiments refer to LTE or LTE-A, other embodiments may be used for 3GPP fifth generation (5G)

technology, fourth generation (4G) technology, New Radio (NR) technology, and/or any wireless land access network (WLAN).

Partial Glossary

3GPP Third Generation Partnership Project
5G Fifth Generation
BPCH Broadcast Physical Channel
BWP Bandwidth Part
CP Cyclic Prefix
DL Downlink
DMRS Demodulation Reference Signal
DFT Discrete Fourier Transform
eNB Evolved Node B
FDM Frequency Division Multiplexing
FDMA Frequency Division Multiplexing Access
FFT Fast Fourier Transform
FR Frequency Range
gNB 5G Base Station
ISI Inter Carrier Interference
MIMO Multiple-Input Multiple-Output
MU-MIMO Multi-User MIMO
NR New Radio
OBO Output Back Off
OFDM Orthogonal FDM
Test
PAR Peak to Average Ratio
PDSCH Physical Downlink Shared Data Channel
PDCCH Physical Downlink Control Channel
PRB Physical Resource Block
RE Resource Element
SC Single Carrier
SCS Sub Carrier Spacing
SS Synchronization Sequence
UE User Equipment
UL Uplink

We claim:

1. An apparatus, comprising:
   at least one memory comprising computer program code;
   at least one processor;
   wherein the at least one memory and the computer program code are configured, with the at least one processor, to cause the apparatus at least to:
   transmit at least one indication of synchronization signal block capability to a network entity;
   receive at least one bandwidth part comprising at least one synchronization signal block, wherein the at least one synchronization signal block is associated with at least one type of synchronization signal block, wherein the at least one type of synchronization signal block is a synchronization signal block below a threshold peak to average power ratio or a synchronization signal block associated with legacy waveform; and
   configure at least one waveform based upon the received at least one synchronization signal block associated with legacy waveform, wherein
   the received at least one synchronization signal block below at least one threshold peak to average power ratio comprises at least one indication of physical downlink control channel.

2. The apparatus according to claim 1, wherein the at least one synchronization signal block is associated with at least one physical downlink control channel comprising a peak to average power ratio below a threshold.

3. The apparatus according to claim 1, wherein the at least one synchronization signal block is associated with primary synchronization signal or secondary synchronization signal sequences associated with waveform below at least one threshold peak to average power ratio, and wherein the at least one synchronization signal block is associated with different root index or different cyclic shift.

4. The apparatus according to claim 1, wherein a different synchronization signal block time placement is associated with the at least one type of synchronization signal block.

5. The apparatus according to claim 4, wherein the different synchronization signal block time placement is a primary synchronization signal or a secondary synchronization signal.

6. The apparatus according to claim 5, wherein the primary synchronization signal or the secondary synchronization signal is associated with the threshold level of peak to average power ratio.

7. The apparatus according to claim 1, wherein the at least one memory and the computer program code are further configured, with the at least one processor, to cause the apparatus at least to:
   receive at least one radio resource control signaling or at least one downlink control information.

* * * * *